United States Patent [19]

Racca et al.

[11] Patent Number: 4,574,200

[45] Date of Patent: Mar. 4, 1986

[54] THERMISTOR TEMPERATURE CONTROL CIRCUIT

[75] Inventors: William H. Racca, Two Primrose Dr., Riverside, R.I. 02915; Michael A. Bolvin, 432 Country View Dr., Warwick, R.I. 02886; Mel E. Bilezerian, N. Smithfield, R.I.

[73] Assignees: William H. Racca; Michael A. Bolvin

[21] Appl. No.: 571,746

[22] Filed: Jan. 18, 1984

[51] Int. Cl.⁴ .............................................. H01H 35/00
[52] U.S. Cl. ................................. 307/117; 307/140; 307/252 UA; 219/505; 323/236
[58] Field of Search ................ 307/117, 140, 252 UA; 219/501, 505; 340/593; 323/235, 236

[56] References Cited

U.S. PATENT DOCUMENTS

| | | | |
|---|---|---|---|
| 4,278,873 | 7/1981 | Petrides | 307/117 X |
| 4,316,080 | 2/1982 | Wroblewski | 219/501 X |
| 4,334,183 | 6/1982 | Hauenstein | 307/252 UA X |
| 4,354,120 | 10/1982 | Schornack | 307/140 X |
| 4,420,693 | 12/1983 | Becker et al. | 307/117 X |
| 4,467,386 | 8/1984 | Wasson | 219/501 X |
| 4,493,984 | 1/1985 | Yamauchi | 219/505 X |

Primary Examiner—Harry E. Moose, Jr.
Assistant Examiner—Derek S. Jennings
Attorney, Agent, or Firm—Barlow & Barlow, Ltd.

[57] ABSTRACT

A temperature controlled circuit including a thermistor located in one branch of a bridge circuit containing several resistors, an operational amplifier, all combined in such a manner that a resistor is inserted in parallel with the thermistor to lower its impedance. The branches of the bridge circuit are also arranged in such a way that three branches have a nominal resistance approximately equal to the resistance of the thermistor in parallel with its fixed resistance at room temperature, while the fourth leg on the branch in series with the parallel thermistor and resistance across the voltage source will have a resistance nominally in the range of one-third of the paralleled resistor and thermistor. The arrangement is such that most any thermistor can be utilized merely by changing its parallel resistance, and the operational amplifier will operate with the thermistor over a wide temperature range.

3 Claims, 4 Drawing Figures

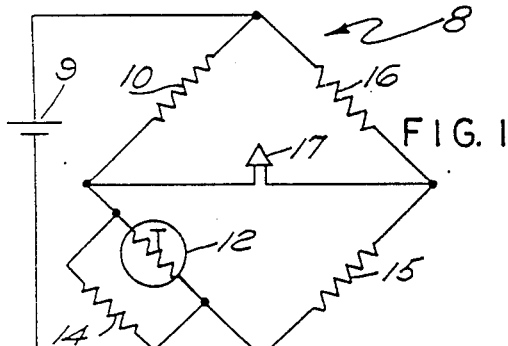
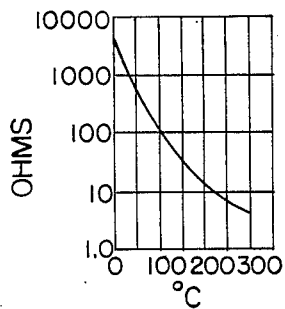
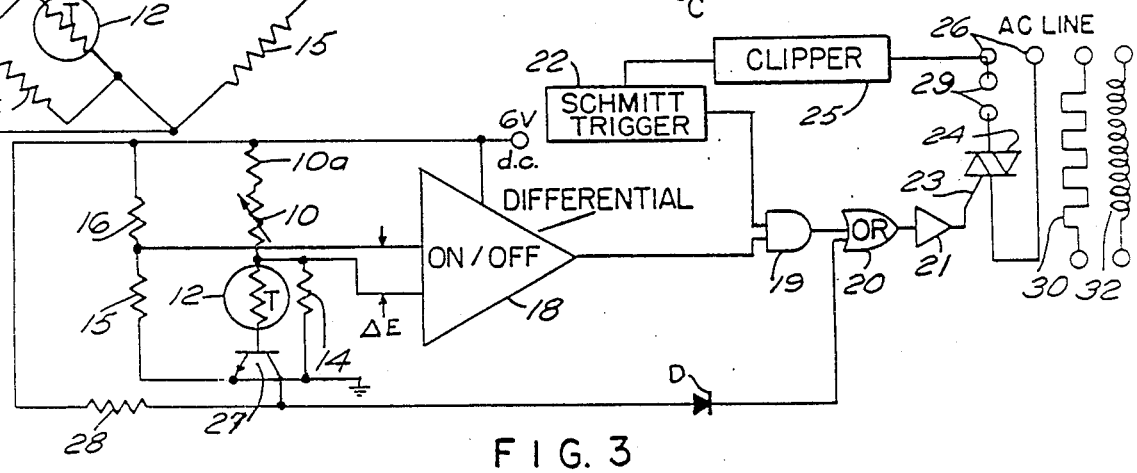
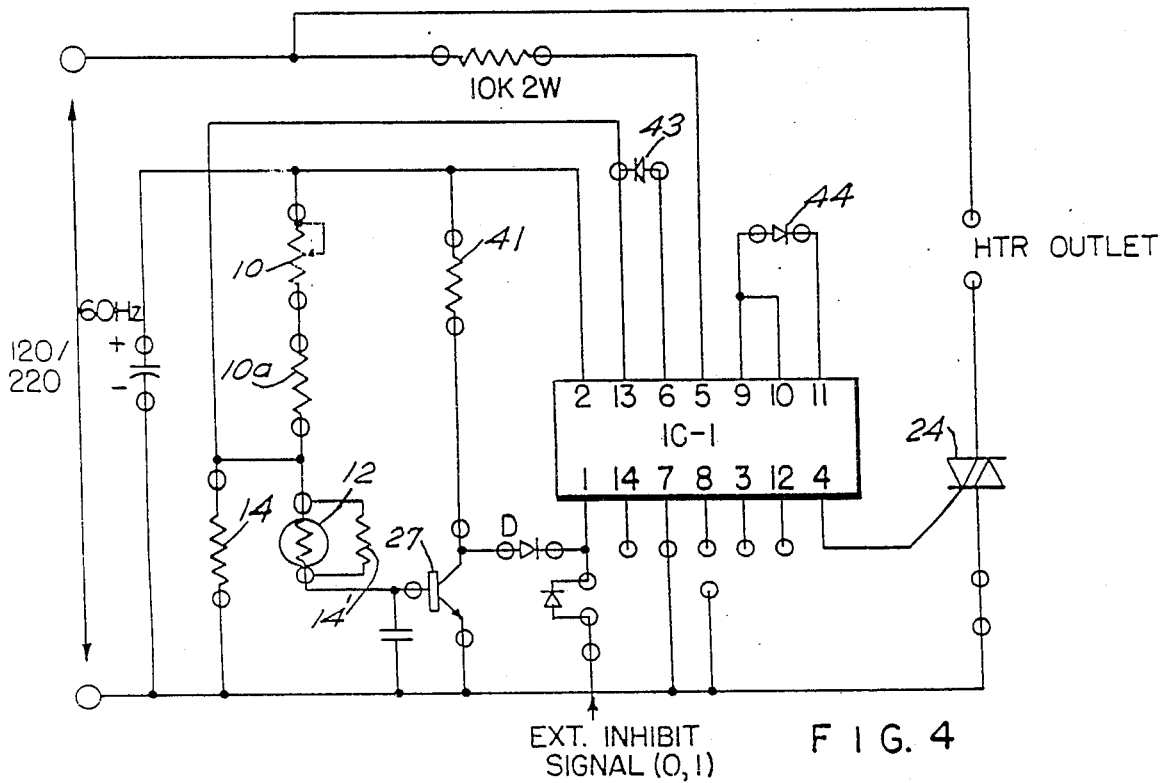

THERMISTOR TEMPERATURE CONTROL CIRCUIT

BACKGROUND OF THE INVENTION

Thermistors are used for temperature measurement since they are essentially resistive elements which behave as variable resistors with heat, that is a resistor with a high-negative temperature coefficient of resistance. In some cases the resistance of a thermistor at room temperature may decrease by almost six percent of each degree rise in temperature. In temperature measurement applications, the thermistor's relatively large resistance change per degree change in temperature provides good accuracy and resolution. Typically, thermistors are connected in simple bridge circuits and, as will be appreciated, readily indicate very small temperature changes. This characteristic, however, has certain drawbacks in that a large temperature range will not produce an output in typical bridge circuit with a differential amplifier for the amplifier will saturate. The sensitivity which would be the percent change in resistance per degree should therefore not saturate or overdrive the associated circuitry. For example, in typical circuits as seen in the U.S. Pat. No. 3,947,656, it is very easy to saturate the differential operational amplifier in an integrated switch, such as the RCA CA3079; and as seen in this patent, the temperature range is limited.

Thermistors as currently manufactured have resistances at room temperature (25° C.) that vary from 100 ohms to 30 megohms. Generally speaking, high resistance units above 100k are used for high temperatures, for example from 300° F. to 600° F., while the intermediate resistance units from 2k to 75k are used at intermediate temperatures of 150° F. to 300° F., and the low resistance units 100 to 1k are for measuring low temperatures from −100° F. to 150° F. It has been recognized that the maximum resistance of the thermistor at low temperatures must not be excessive as spurious signal pick-up can result, which then leads to the use of shielded lines. Further it has been recognized that the minimum resistance at high temperatures must not be too low, as this will result in a decrease in sensitivity. In designing standard bridge circuits for use with thermistors, the rule of thumb has been to select the series resistor and the opposite bridge leg resistor equal to the thermistor resistance at the mid point of the temperature range being measured and the adjacent bridge leg resistor selected at the thermistor's resistance at the temperature where bridge null is desired. It can be appreciated therefore, that there are a number of constraints placed on the bridge circuit alone that is used with the thermistor, plus the problem of selecting a suitable thermistor. The above criteria puts severe restraints on a circuit designer and it would be preferable to be able to utilize a single thermistor for a plurality of applications.

SUMMARY OF THE INVENTION

It is an object of the present invention to provide a wide temperature resistance characteristics of a thermistor and its associated resistance network.

A further object of the present invention is to maximize the range of a given thermistor by changing a single paralleling resistance.

A still further object of the invention is to reduce the impedence of the bridge circuit so that the sensing bridge circuit in the form of an operational amplifier is not noise sensitive, particularly in high-temperature applications.

The present invention provides a circuit in which the first branch of the bridge circuit consists of a first resistance, and the second branch of the bridge circuit consists of a resistance in parallel with the thermistor. Specifically, the resistance in parallel with the thermistor is selected so that the ratio of the first resistance that forms the first branch of the bridge to the resistance of the second branch of the bridge, which comprises the second resistor in parallel with the thermistor, is such that at room temperature the ratio will be between 1:3 and 1:4. Preferably, the resistance of any branch is selected to be on the order of 10k ohms, and in a practical application, the bridge is completed by two resistors; and sensing is had by a high-gain balanced amplifier such as a differential operational amplifier, which may then drive a triac-gating circuit.

BRIEF DESCRIPTION OF THE DRAWINGS

FIG. 1 is a basic circuit of the invention;

FIG. 2 is a graph showing typical resistance changes with temperatures of thermistor units;

FIG. 3 is a circuit diagram of a complete circuit incorporating the present invention; and FIG. 4 is a circuit diagram of a practical embodiment of the present invention.

DETAILED DESCRIPTION OF THE PREFERRED EMBODIMENTS

As illustrated in FIG. 1 of the drawing, a d.c. embodiment is illustrated in which the temperature sensitive element is set in one branch of a resistive bridge 8. The first branch of the bridge is formed of a resistance 10 in series with the second part of the bridge formed by a temperature sensitive resistor or thermistor 12 in parallel with the resistance 14. The remainder of the bridge circuit is formed by serially connected resistors 15 and 16. A voltage supply 9 is across the diagonal of the serially connected first and second branches, while differential amplifier 17 senses the balance thereof across the other diagonal at the junction of the first and second branches, and the junction of resistors 15 and 16. Essentially, the differential amplifier will produce an output until balance is obtained. Now, if the resistance of thermistor 12 is large, the differential amplifier saturates as ΔE becomes too great for the amplifier which is, in essence, a high-gain balanced amplifier. To avoid this, parallel resistor 14 makes the thermistor branch of the bridge "look" like a lower resistance; and the voltage divider effect of resistors 15, 16, 10, 14 and 12 brings the voltage into a range that the amplifier can handle.

It is important to adjust the impedance of the bridge circuit, as will be apparent as this description progresses. The differential amplifier that is used to sense the inbalance is a sensitive device that should be looking at a fairly low impedance, something that is on the order of 10k ohms. To achieve this the resistor 15 and the parallel resistance value of the thermistor 12 and its parallel resistor 14 should both be on the order of 10k ohms, taking the value of the thermistor 12 at 25° C. Also, resistances 10 and 16 should be chosen in the same value range of approximately 10k ohms.

Referring to FIG. 3, one practical utilization circuit that can be used on alternating current, and which will adapt itself to a triac switched load, is illustrated. Essentially this comprises a differential amplifier 18 and a AND gate 19 which feeds an OR gate 20, which in turn feeds a triac gating circuit 21. The triac 24 is seen in a conventional set-up having a gate 23 and its main power terminals connected between an AC line 26 and load terminals 29. In order to have the triac turn on at the zero voltage crossing of the AC line, a Schmitt trigger 22 is provided, fed by a clipper 25 from the AC line 26, the Schmitt trigger having its output connected to the AND gate 19. Essentially the Schmitt trigger will produce a pulse output at the zero crossing so that if a signal is being sent by the differential operational amplifier 18, it will only pass at the time that the pulse is present, and in this way the triac is only gated at the zero crossing points. From a protection standpoint of the thermistor 12, a transistor 27 is connected so that its base emitter completes the circuit in the bridge leg containing the thermistor 12, while its collector feeds through a diode D to an input of the OR gate 20. Thus should there be a failure of the thermistor which would generally indicate the thermistor going open, the base of transistor 27 will float. This means that the collector which will be connected to a supply of voltage through a dropping resistor 28, will go high and diode D will conduct, which will now shut the triggering down as the OR gate 20 will now not conduct, having two positive pulses at its input or stated in logic terms, two 1's. As indicated in the drawing, the switched loads may consist of resistors such as 30, which could be a heater located, for example, in a compartment. In that same compartment would be located the thermistor 12 which would sense the temperature therein and control it. For example, the resistor 30 may be a thick film resistor located at the heating compartment of an asceptor device for contact lenses. Additionally, the load could consist of the coil of a latching relay such as 32, each of these loads connected at terminals 29.

Referring now to FIG. 2, there is illustrated a typical resistance-temperature curve for a thermistor. In that graph, it will be seen that at room temperature, the thermistor has a resistance of approximately 2,000 ohms. By increasing the temperature to 100° C., the resistance has dropped to approximately 185 ohms. It can therefore be seen that over a rather nominal operating range from room temperature to the temperature equivalent of boiling water at sea level, that the resistance range is on the order of 10. When one wishes to go beyond that to say 200° C., the range now becomes $10^2$. These are very large variations for rather normal temperature ranges that one would wish to measure. Considering the bridge circuit that has been discussed, it can be appreciated that with such a large variation in one leg of the bridge, it would be almost impossible for the bridge to balance itself in any way for the differential amplifier to sense that large change. The solution to the problem is to make the thermistor leg of the bridge look like another resistance; and to accomplish this, the resistor 14 is placed in parallel with thermistor to bring its effective resistance to a lower value. In essence, referring again to FIG. 2, the curve is translated downwardly so that it becomes flatter when a resistor 14 is placed in parallel with a thermistor.

The arrangement of the bridge circuit resistors is such to provide a unique temperature sensing range using a thermistor as a sensor. For example, if one considers that the thermistor selected has a resistance at room temperature (25° C.) of 20k ohms, and assuming that resistor 10 is 2.7k ohms, then resistor 14 must be selected of a value that parallels with the thermistor at room temperature to give a ratio of resistor 10 to the parallel resistance network of 1:3. To achieve this, resistor 14 can be selected at 18k ohms. By following the normal parallel resistance formula, we find that multiplying the product of the parallel resistors and dividing by the sum, the result is 360/38, which equals 9.47k ohms; this is now in keeping with the basic concept that the ratio should be between 1:3 and 1:4 since resistor 10 was 2.7k ohm When these results have been achieved, the thermistor can be used room temperature to approximately 85° C. or higher. In all cases, the ratios that are mentioned are achieved at the low end of the range which is to be measured, which for example, can be room temperature or any other low end of a temperature range, which application may dictate.

The above example, which is purely by way of example, may be used as a guide since thermistors are supplied in a wide ohmic range, so the analysis can be applied to cover several hundreds of thousands of ohms to allow one to cover temperature ranges up to 500° C. The governing principle is to maintain the ratio difference between the temperature selecting resistance, which is resistance 14, as in a variable potentiometer, within a ratio of 1:3 or 1:4 so as not to bound or saturate the differential sensing amplifier.

In addition, as mentioned before, it is advantageous to maintain the impedance of the circuit low, that is on the order of say 10k ohms. Assume, therefore, by way of example, that the potentiometer has a maximum resistance of 10k ohms, resistor 10a is 2.7k ohms, and the base emitter resistance of transistor 27 is approximately 2.7k ohms. We now have a situation where we can select the resistance of resistor 14 so that when it parallels with the thermistor, the resulting resistance value will be on the order of 12k ohms. In this second example given, we can assume that the resistance of the thermistor is relatively high (5 meg) at 25° C. Thus, resistor 14, for all practical purposes can be 13k ohms which keeps within all of the parameters mentioned. However, in arranging the circuitry it should be kept in mind that potentiometer 10 which has a 10k ohm value can be adjusted downwardly to about 3k ohms to suit the ratio of between 1:3 and 1:4. Essentially, merely by changing resistance 14 any variety of thermistors can be accommodated to suit a variety of conditions; and further, put the circuit into operation by creating an unbalance.

Referring now to FIG. 4 of the drawings, there is shown a practical embodiment utilizing an existing integrated circuit, such as the RCA CA3059 that contains essentially the discrete components that have been illustrated in FIG. 3 that are basically necessary to the proper operation of a temperature measuring bridge circuit. In this particular case the other two branches of the bridge circuit are represented by resistors 15 and 16 internal of the integrated circuit, which have a value in the vicinity of 10k ohms. Terminal 1 of the integrated circuit is an inhibit input so that when the collector of transistor 27 goes high, it will prevent any further operation at the output. Terminal 5 is a power input to an internal d.c power supply. Also, as will be seen, terminals 2 and 13 of the integrated circuit are the inputs of the two legs of the bridge circuit, and terminal 7 is the common. Also at terminal 2 is a supply of positive d.c. voltage that feeds the collector of transistor 27 through a dropping resistor 41 having a value of approximately 100k ohms. Now, let us assume that the thermistor shorts in lieu of opening, as was explained above. Two things happen. First, the resistor 10*a* puts the differential amplifier in such an unbalance that nothing happens; but more importantly, terminal 6 of the integrated circuit, which is connected to the base of the output amplifier, will cause diode 43 to conduct, which will now cause current flow through the shorted thermistor and the base and emitter of transistor 27; and since pin 6 has high priority at the last stage; this now shuts the last stage down and triac 24 turns off. We have now, in effect, double protection for shorted thermistors. Diode 44 compensates for variations in the base to emitter voltage of transistor 27 and prevents reverse current flow when terminal 31 goes high.

Now, if diode D or 43 opens, the fail-safe circuit will not function, but resistor 10*a*, whose resistance is greater than the resistance of the base to emitter junction of transistor 27, will insure an unbalance in the differential amplifier to a degree that will prevent any output.

We claim:

1. Method of constructing a temperature responsive Wheatstone bridge having branches using a thermistor that will control a circuit over a temperature range having a maximum temperature and a lower temperature, wherein said maximum temperature and said lower temperature having a temperature ratio of greater than 4:1 comprising the steps of:
   a. selecting a thermistor which will have a resistance at the maximum temperature of the range of approximately 1k ohms,
   b. placing the thermistor in a branch of said bridge and selecting a resistance to parallel the thermistor and reduce the impedance of said thermistor branch at the lower temperature end of the range,
   c. selecting a variable resistance in a branch in series with the thermistor branch between a upper and lower value of the resistance of the thermistor in parallel with the resistance operating in said range whereby a low impedance bridge may be constructed with low noise and low leakage,
   d. applying a voltage across the series connection of the variable resistance and thermistor, whereby the output of the bridge will be a voltage level to control an operational amplifier in open loop format.

2. The method as in claim 1 wherein the variable resistance branch and the thermistor branch with its paralleling impedance is selected to fall in the range of approximately 10k ohms per branch.

3. The method as in claim 1, including the additional steps of applying the output of the bridge to the input of an open loop operational amplifier; applying the output of the amplifier to a triac control circuit.

* * * * *